United States Patent
Jonkers

(12) 
(10) Patent No.: US 6,182,152 B1
(45) Date of Patent: *Jan. 30, 2001

(54) METHOD AND SYSTEM FOR SYNCHRONIZING CONCURRENT SEQUENTIAL PROCESSES USING INTRAPROCESS UPDATE OPERATIONS AND INTER-PROCESS ADAPT OPERATIONS

(75) Inventor: Henricus B. M. Jonkers, Eindhoven (NL)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/779,392

(22) Filed: Jan. 7, 1997

(30) Foreign Application Priority Data

Jan. 9, 1996 (EP) .................................... 96200040

(51) Int. Cl.[7] ........................................................ G06F 9/00
(52) U.S. Cl. ............................................................ 709/310
(58) Field of Search ............................. 395/670; 709/100, 709/101, 215, 310–318

(56) References Cited

U.S. PATENT DOCUMENTS

| | | | |
|---|---|---|---|
| 4,569,015 | * | 2/1986 | Dolev et al. .................... 395/200.31 |
| 5,363,505 | * | 11/1994 | Maslak et al. ........................ 395/670 |
| 5,867,656 | * | 2/1999 | Iwasaki et al. ....................... 709/215 |
| 5,878,225 | * | 3/1999 | Bilansky et al. ................ 395/200.57 |

FOREIGN PATENT DOCUMENTS

| | | | |
|---|---|---|---|
| 0201020A2 | 12/1986 | (EP) | .............................. G06F/15/16 |
| WO9510805 | 4/1995 | (WO) | .............................. G06F/11/14 |

OTHER PUBLICATIONS

Orfali et al., "Essential Client/Server Survival Guide," pp. 255–260, 370–372, 1994.*

* cited by examiner

Primary Examiner—Alvin E. Oberley
Assistant Examiner—St. John Courtenay, III
(74) Attorney, Agent, or Firm—Brian J. Wieghaus

(57) ABSTRACT

Concurrent sequential processes synchronize by intra-process amend operations and inter-process operations. To each interactive subset of processes a part of an associated I/O channel is assigned. Each inter-process operation includes one or more update operations for exchanging information between an associated process of the pair and its in-channel part, and also one or more adapt operations for in-channel moving of information between the respective parts assigned to the processes of the pair.

20 Claims, 4 Drawing Sheets

METHOD AND SYSTEM FOR SYNCHRONIZING CONCURRENT SEQUENTIAL PROCESSES USING INTRAPROCESS UPDATE OPERATIONS AND INTER-PROCESS ADAPT OPERATIONS

BACKGROUND OF THE INVENTION

The invention relates to a method for synchronizing concurrent sequential processes by means of assigning intra-process update operations and assigning inter-process adapt operations. Each process can execute a sequence of steps, wherein each step may lead to amending internal state variables, and also to actions on the communication structures between the process in question and one or more other processes. Each such step or action should appear to another process as being atomic: any intermediate state between the initial and the final state of the step should be invisible to all other processes.

In particular, it should be possible to define steps that access local state variables and/or I/O channels, whilst maintaining atomicity of these steps. It should also be possible to achieve condition synchronization by putting constraints on the mutual order between executing steps of different processes, based on arbitrary conditions formulated in terms of the local state variables and I/O channel contents of a particular process.

SUMMARY OF THE INVENTION

Therefore, amongst other things it is an object of the present invention to maintain such atomicity and also to retain such mutual order when required. Now, according to one of its aspects, the invention is characterized by forming at least one subset having an associated plurality from the interactive processes, assigning to the subset an associated I/O channel and to each process of the subset a part of that channel, in that each inter-process operation comprises a first collection of access operations for exchanging information between an asscoiated process of the subset and its in-channel part, and a second collection of adapt operations for in-channel moving of information between the respective parts assigned to the processes of the subset, which adapt operations are each synchronous with a respective receiving process. The conceptual separation so presented can be maintained in a straightforward manner.

Relevant art on the use of low-level semaphoring has been described in U.S. Pat. No. 3,997,875 to the present assignee. This art preserves the above atomicity only for a very particular purpose. Another earlier solution for maintaining condition synchronization is by means of so-called condition variables, that must become true to bring a particular synchronizing operation into action. A known manner to combine the two above features is through communication structures such as mailboxes between concurrent processes, that have been disclosed in U.S. Pat. No. 4,769,771 assigned to the present assignee. Such mailbox encapsulates a set of variables that are shared by two of the processes. The present invention however provides adequate and generally applicable solutions for problems that could not be solved by the prior art.

Advantageously, any change effected by a first process to a channel state of its in-channel part causes an update operation signalling, to render a subsequent adapt operation pending. This renders the steps of a process atomic by definition. In particular, the signalling process maintains a table of all update operations signalled by it; the process that receives the adapt signalling, likewise maintains a table of all signallings so received. The purpose of an update operation is to make the local changes to an I/O channel visible to adapt operations, and signal the adapt operations to other processes connected to the relevant channel(s) such that they can adapt to the changed channel state for so effecting synchronization. The adapt-and-update mechanism is built into the I/O channels that connect the various processes. Thereby, these processes can be rendered invisible to a process designer.

Advantageously, a process terminates its action sequence atomicity by executing any of three synchronizing operators: commit, sync, or wait. Thus, the only way for a process to control the executing of adapt operations is through the synchronization operators discussed hereinafter. The inventor has found that these three operators allow an extremely elementary organization for implementing synchronization primitives, which express the conditions in terms of local variables only.

Advantageously, the method has a compound operator next that executes all pending update operations in a single atomic action, followed by executing all pending adapt operations of a current process. This scheme provides full condition synchronization for arbitrary conditions that are formulated in terms of local variables and communication structures, which represents a fine operational feature.

The invention also relates to a system for effecting synchronization according to the method recited supra. Further advantageous aspects of the invention are recited in dependent Claims.

BRIEF DESCRIPTION OF THE DRAWINGS

These and other aspects and advantages of the invention will be discussed in detail with reference to preferred embodiments disclosed hereinafter, and in particular with reference to the appended Figures wherein.

DESCRIPTION OF THE PREFERRED EMBODIMENTS

Figure 1:
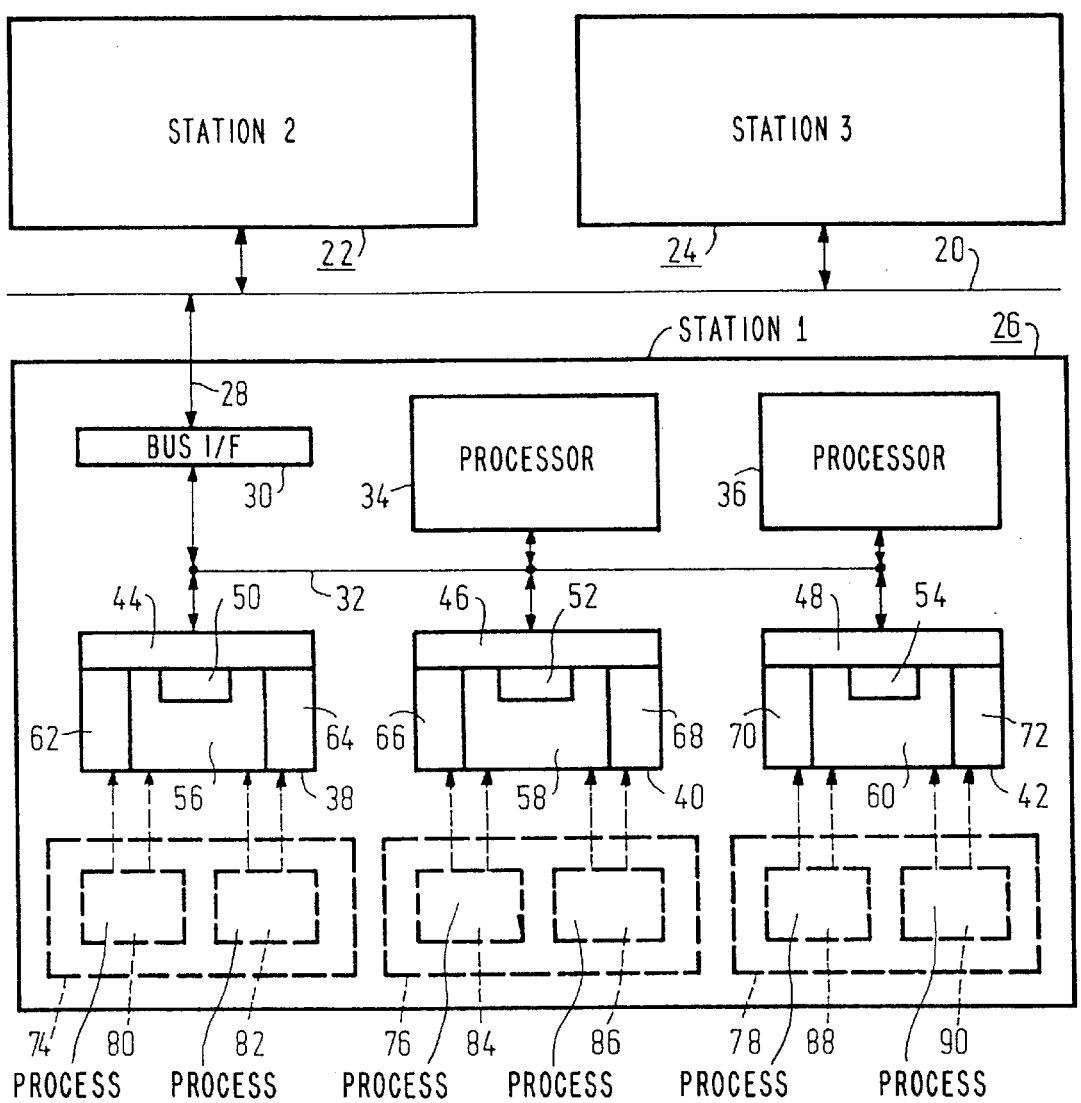
FIG. 1 is a block diagram of a complex multiprocess system.

For background, FIG. 1 is an exemplary block diagram of a complex multiprocessor multiprocessing system as disclosed in U.S. Pat. No. 4,769,771. Reducing the amount of facilities shown is feasible for therein implementing an embodiment of the present invention. The system as shown has three stations 22, 24, 26, of which only the last one has been shown in detail. They are interconnected by bus 20. Station 26 has two processors 34, 36, local storage in blocks 38, 40, 42, bus interface 30 with external attachment 28, and internal bus 32. Memory block 38 is assigned to superprocess 74 that comprises processes 80, 82. The on-memory mapping of any process or superprocess can be conventional, and for clarity the processes have been shown by interrupted lines. Memory block 38 has bus interface 44. It contains code assigned to process 80 in block 62, code assigned to process 82 in block 64, shared data in block 56, and mailbox facility 50 for superprocess 74. The set-up for superprocesses 76, 78, and associated hardware and processes compare to that of superprocess 74. According to the reference, inter-process communication is organized by means of the mailboxes. No further detailing is deemed necessary here.

Present-day computer-oriented hardware is rendered functional for a particular purpose only through specifying the workings thereof by an ever increasing amount of appropriate software, that fits both to the hardware and to the intended application functionality. Generally, such software is of the multiprocessing type, inasmuch as this allows reusability of the various software modules, mutual interfacing between the modules on a manageable level of complexity, sharing of programming effort over multiple persons, and easier checking for errors. It has been found necessary to specify the various modules according to a straightforward methodology, in order to guarantee reliability, consistency, and maintainability. Relevant art is disclosed in H. B. M. Jonkers, Overview of the SPRINT Method, Proceedings of the Formal Methods Europe Conference 1993 and published in Lecture Notes on Computer Science, No. 670, pp 403–427, Springer 1993. A basic language COLD is used therein for describing systems in an abstract manner without necessitating the specifying of an implementation. The SPRINT methodology allows for an easy way to subsequently implement such systems. A specific solution based on SPRINT has been dislosed in EP 95202615.1, corresponding U.S. patent application Ser. No. 08/721,161 to the present assignee.

Figure 2:
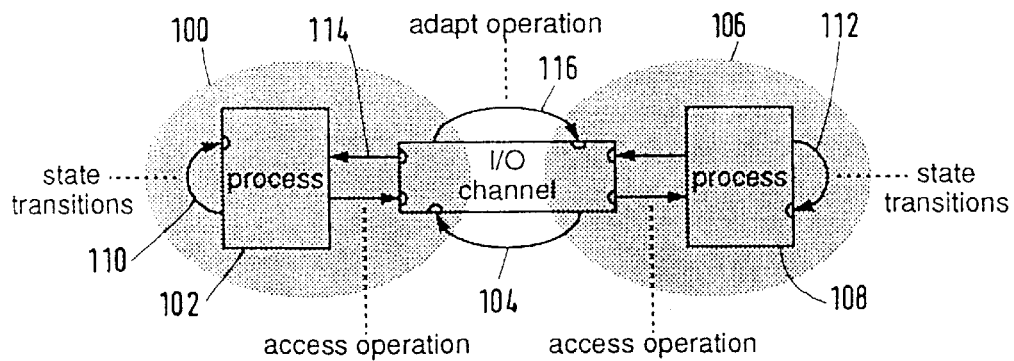
FIG. 2 symbolizes separating of access and synchronization.

FIG. 2 symbolizes separating of access and synchronization by means of an I/O channel between processes 102 and 108 that are symbolized as blocks. Shaded regions 100, 106 indicate the respective processes and their direct environments. Such environment contains all variables that are directly accessible by the process in question, without the necessity for undertaking a communication operation. Arrows 110, 112 indicate self-generated process state transitions or steps. Generally, any transition is synchronized with the receiving process that has the small half circle drawn therein. The process pair has an I/O channel 104 assigned thereto. Now, the access to and synchronization inside the I/O channel are strictly separated. Each I/O channel provides a collection of access operations, allowing the associated process to read from or to write into the channel in a way that is non-blocking and non-interfering with respect to one or more other processes. In principle, the channel may be a structure that interconnects more than two processes, while a pair or other subset of processes may be connected by a plurality of channels in parallel. Also, each I/O channel provides a collection of synchronizing adapt operations, that move information from one process connected to the channel to another process also connected to the channel, whilst restricting to the channel. A step of a process therewith comprises a sequence of two types of actions: first internal process state transitions, including operations on I/O channels, are executed. Next, the signalled update operations are executed with respect to the I/O channels, and adapts are signalled to the other process in question. This makes the first transitions by definition atomic. The other process subsequently executes the adapt operations so signalled. Using the synchronizing operators recited below, a process can explicitly terminate the atomicity of a sequence of actions which will generally lead to executing one or more adapt operations. The Figure shows the three types of transitions: state transitions 104, access operations 114, and adapt operations 116.

Adapt operations are the atomic synchronizing actions. An adapt operation moves information from a sender process connected to a particular I/O channel to the other receiver process connected to the same I/O channel. The execution of the adapt operation is synchronized with the receiver, and non-interfering with the sender. An adapt operation is signalled by the sender process for execution to the receiver process, to wake up the latter. This feature makes an adapt operation pending at the receiver process: the receiver process keeps a table of all adapt operations signalled to it.

In order to guarantee that the net effect of the changes made to the states of the various I/O channels becomes visible to other processes only at the end of an atomic action, a second signalling mechanism is provided, as discussed earlier. Whenever a process P changes the state of an I/O channel, an update operation is signalled, which makes the update operation pending at the process P. The signalling process keeps a table of all update operations signalled by it. The purpose of the update operation is to render the local changes to an I/O channel visible to adapt operations, and signal the adapt operations to the processes connected to the channel such that they may adapt or synchronize to the changed state of the channel.

A process can control the atomicity of a sequence of its actions by executing one of three synchronization operators: COMMIT, SYNC, and WAIT. The operators are as follows, being defined as Macros in C.

COMMIT; is used for terminating atomicity, it executes all pending update operations of the current process in a single atomic action. This makes the internal state transition performed by the process visible to the external world as an atomic action, i.e. it 'commits' the internal state transition.

SYNC; lets the process synchronize to the outer world, it executes all pending adapt operations of the current process as individual atomic actions. This renders state transitions in the external world visible to the process, i.e. the process 'synchronizes' with the external world.

WAIT; lets the process wait for the reception of an adapt signalling, it blocks the current process until there is at least one pending adapt. If there are already pending adapts, the process simply continues.

Also, the following compound primitives are defined. NEXT operates like COMMIT, but subsequently executes also all pending adapt operations of the current process. This renders the states of the I/O channels that have been changed by other processes visible to the current process.

AWAIT(X) executes the above operator NEXT, and subsequently evaluates X. When the boolean return value of the evaluation is true, the process continues. Otherwise, the process remains blocked until a next adapt signal is received. After reception and execution thereof, first X is re-evaluated, etc. Herein, if X is an expression formulated as arbitrary conditions in terms of local variables and communication structures, and which returns a boolean result, the latter operator provides full condition synchronization.

Figure 3:
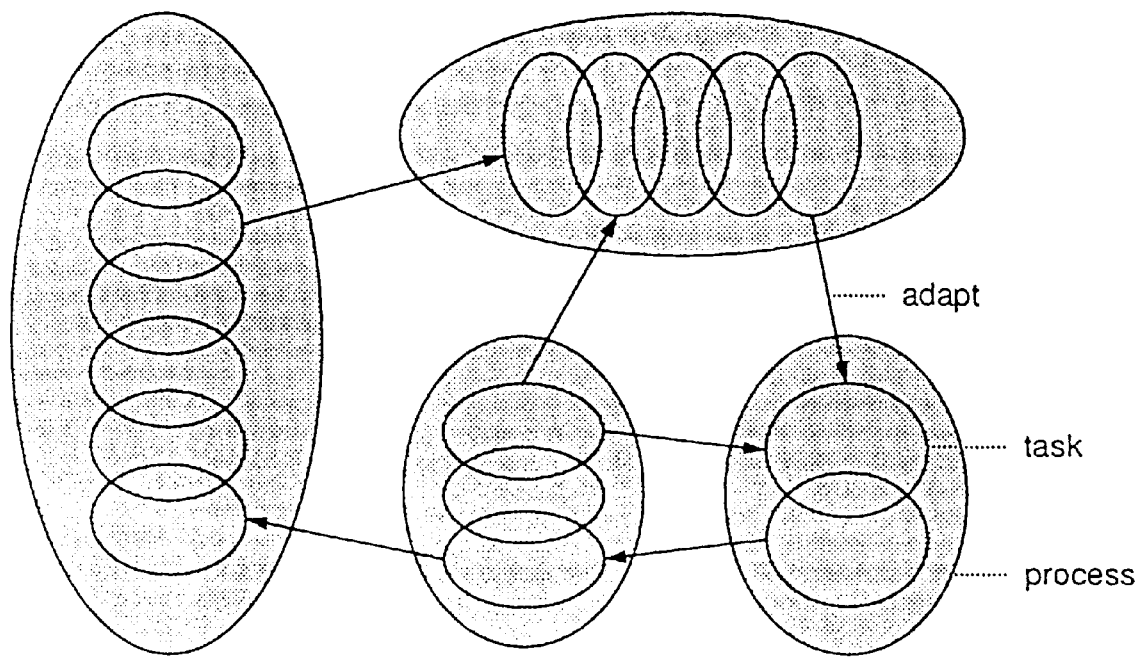
FIG. 3 symbolizes inter-process adapt operations.
Figure 4:
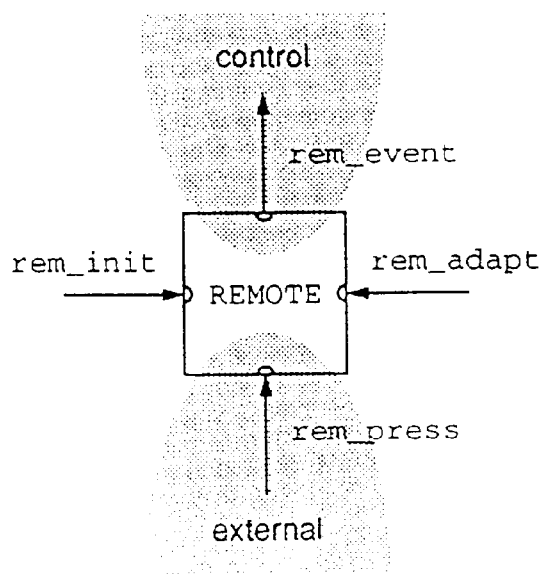
FIG. 4 shows a conceptually elementary remote eye component.

FIG. 3 generally symbolizes inter-process adapt operations. The basic idea of process communication herein is as follows. If process P1 wants to send data to process P2, P1 may signal that a communication action, called an adapt operation, should be performed with respect to P2. Process P1 is called the sender and P2 the receiver of the adapt operation. The purpose of an adapt operation is to move information from the domain of the sender to the domain of the receiver. In FIG. 4, processes show as darker ellipses, that may contain various tasks or subprocesses to be executed shown as smaller ellipses, and may interact by means of adapt operations shown as arrows. Processes do not execute adapt operations themselves, because untimely execution may cause undesired interference with other processes. The execution of adapt operations is controlled by the run-time system, which besides the execution of adapt operations also controls the execution of steps or tasks.

FIG. 4 shows a conceptually elementary remote eye component. The component is accessed by an internal process 'control' and by an external process. The external process puts keys or codes in a local buffer in its own domain through the rem_press operation. This operation can be seen as an interrupt service routine that is called whenever a key is received. The operation will signal to the run-time system that the adapt operation rem_adapt should be executed. The adapt operation will be executed by the run-time system 'as soon as possible', making sure that no interference exists between the internal and external processes. Executing the adapt operation will have the effect of moving the key from the domain of the external process to the domain of the control process. Moreover, the run-time system will activate the (task of) the control process, which handles the event using the rem_event operation. The latter will typically read the key from the buffer in the domain of the control process. The rem_init transformer is meant for one-time use at system initialisation time. It initialises variables in both domains, which is the reason that it does not belong to any of the two process domains shown.

Figure 5:
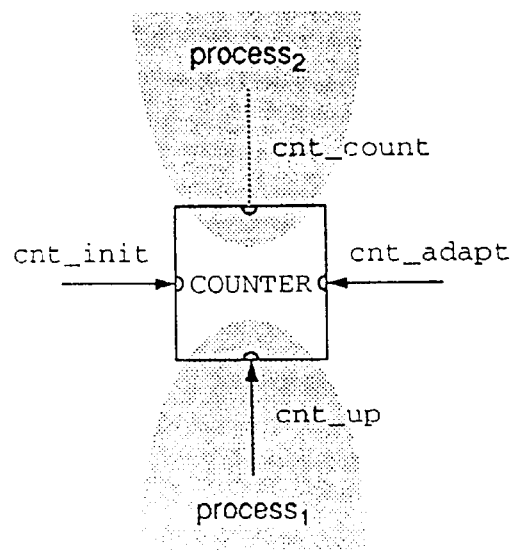
FIG. 5 shows a component counter.
Figure 5A:
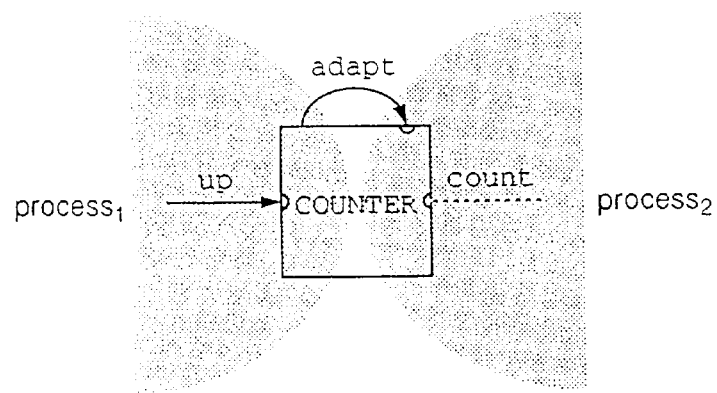
FIG. 5a is a variation on FIG. 5.

FIG. 5 shows a component counter, as an exemplary embodiment for synchronizing two processes. Synchronizing among more than two processes differs therefrom to a limited extent only: the update signals are sent from the originating process to all other processes that should synchronize. The adapt operations are however fully independent from each other.

Now, the example serves to illustrate the use of the signalling and synchronization mechanisms. The example consists of a counter that can be accessed synchronously by two processes, process1 and process2. Process1 can increment the counter by means of the operation 'up', and process2 can observe the value of the counter using the operation 'count'. The counter is initialized at zero. Process2 does not directly observe the value of the counter as changed by process1, but rather observes a private copy that is kept up to date by the adapt operation 'adapt'. The adapt operation is signalled as soon as the value of the counter is changed by process1 (using an 'up' operation). The adapt operation should be executed before the next step of process2, so that process2 is kept up to date with respect to the value of the counter. Hereinafter, we describe the implementation problem and the implementation of the counter.

From the point of view of process1, the operation 'up' is an atomic action that can be used as building block for its steps. From the point of view of process2, the *steps* of process1 are the atomic operations and not such operations such as 'up' (which are internal to process1 ). This implies that process2 may only observe the value of the counter at the end of a complete step of process1; it should not be able to observe any intermediate value due to internal action of process1 for example, if process1 would consist of the following code:

```
while( true )
{
    up; up;
    COMMIT;
}
``` then all counter values observed by process2 should be even values, although internally in process1 the counter may temporarily have an odd value. We shall show below how the process control primitives can be used to achieve this in a manner that is independent of the usage of the component.

At the implementation level we need a variable count0 in the domain of process1 that contains the internal value of the counter as observed by process1, and a variable count 1 that contains the value of the counter at the end of the last complete step of process1. The latter variable acts as the 'adapt variable' that is used by 'adapt' to update process2 's perception of the counter value, which is represented by a third variable count2. The latter is 'updated' by process1 at the end of its step when performing a COMMIT (see above). Hence, the counter contains three state variables:

static int count0, count1, count2;

Initialisation of these state variables amounts to:

count0=count1=count2=;

'Count' is the operation used by process2 to read the value of the counter. Its value is identical to that of the state variable 'count2 ', as implemented by:

```
int count( void )
{
    return count2;
}
```

The 'up' operation increments the counter in the domain of process1. The effect of 'up' should not be directly visible to process2, which is achieved by making process1 increment count0 (instead of count1 ), and signalling that an operation 'update' should be executed at the end of the step of process1. At the end of its step, process1 should update count1 and signal 'adapt' to process2. This leads to the following implementation of 'up':

```
void up( void )
{
    count0++;
    u_signal( update );
}
```

Here, 'u_signal( update )' makes 'update' pending at the process executing the 'up' operation, i.e. process1. The purpose of the 'update' operation is to make the changed value of the internal variable count0 in the domain of process1 visible to process2 by copying it to count1 and signalling to process2 that it should execute the 'adapt' operation to become aware of the changed value of the counter, giving rise to the following implementation of the 'update' operation:

```
void update( void )
{
    count1 = count0;
    a_signal( adapt, process2 );
}
```

Here, 'a_signal( adapt, process2 )' makes 'adapt' pending at process2. The operation 'adapt', when executed by process2 immediately before its next step, should take care that process2 synchronizes with the modified value of the counter by copying the value of count1 to count2:

```
void adapt( void )
{
    count2 = count1;
}
```

The execution of all pending update operations (i.e. COMMIT) should be a single atomic action, and the execution of each individual adapt operation (by SYNC) should be an atomic action as well, which can be achieved in several ways. Interrupts or preemption can be switched off temporarily, or a special semaphore, called the 'adapt semaphore' can be introduced in each process, which can be used to protect access to the adapt variables of the process. We describe a possible realization in pseudo_C of the synchronization operators in terms of the latter solution, where 'sema(p)' denotes the adapt semaphore of process p and WAIT(s) and SIGNAL(s) are the wait and signal operations, respectively, on semaphore s.

```
COMMIT: let p be the current process;
    WAIT( sema( p ) );
    while( there is a pending update operation in the current process )
    { execute the update operation; }
    SIGNAL( sema( p ) );
SYNC: while( there is a pending adapt operation in the current process )
    {
        let p be the process that signalled the adapt operation;
        WAIT( sema( p ) );
        execute the adapt operation;
        LEAVE( sema( p ):
    }
WAIT: block until there is a pending adapt operation in the current process;
```

Here, execution of a pending update or adapt operation implies that the operation is no longer pending. The compound synchronization operators NEXT and AWAIT are described by the following C macro definitions:

```
#define NEXT        { COMMIT; SYNC; }
define AWAIT( X )   { NEXT; while( !( X ) ) { WAIT; SYNC; } }
```

The use of the NEXT and AWAIT operators is demonstrated below by the code of process1 and process2, connected by a counter as discussed supra:

```
process1: while( true )
{
    . . .
    up; up;
    NEXT;
}
process2: while( true )
{
    int c = count();
    assert( c % 2 == 0 );
    AWAIT( count() - c >= 10);
}
```

Herein, process1 executes an infinite loop in which it performs some local actions indicated by the ellipses ( . . . ), and increments the counter twice, after which it performs a NEXT operation. The NEXT operation makes the new value of the counter visible to the external world and makes process1 synchronize with any observable changes in the external world, assuming that the process is connected to other I/O channels as well.

Process2 executes an infinite loop as well, in which it reads the value of the counter and waits until the counter has been incremented by at least a value 10, after which it performs some local actions, indicated by the ellipses ( . . . ). The counter values read by process2 are always even, so the assertion in the 'assert' statement will always be true.

FIG. 5$a$ is a variation on FIG. 5, wherein the associated expressions are as follows:

```
static Nat      count0, count1, count2;
static Adapt    c_adapt;
static Update   c_update;
void init ( Process p1, p2 )
{ count0 = count1 = count2 = 0;
    c_adapt = a_create( adapt, p1, p2 );
    c_update = u_create( update );
}
void count( void )
{ return count2; }
void up( void )
{ count0++; u_signal( c_update ); }
void adapt( void )
{ count2 = count1; }
void update( void )
{ count1 = count0; a_signal( c_adapt ); }.
```

Figure 6:
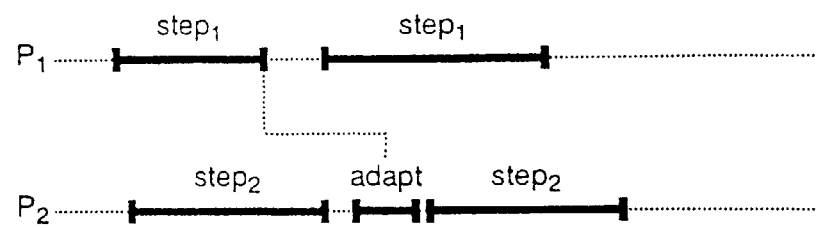
FIG. 6 symbolizes adapt and update operations in time.

FIG. 6 symbolizes adapt and update operations in time according to the invention. Here, line P1 comprises the internal actions inside process P1; line P2 the same for process P2. The adapt operation in process P2 is always effected immediately after execution of a step in process P2. In this manner, send-adapt operations are synchronized with the receiver rather than with the sender. The above solves half of the problem. The other half is to avoid interference between the adapt operation and the sender process P1. In fact, the organization as depicted looses synchronization between the adapt operation and the steps of process P1. The following three requirements should be met by the application, and are sufficient for avoiding interference between the adapt operation and the steps in process P1:

1. The variables in the domain of P1 that are read by the adapt operation always have values that are consistent with the state of process P1 immediately after its latest completed step.
2. The variables in the domain of process P1 that are written by the adapt operation are not read by process P1. The variables in P1, that are accessed (either read or write) by the adapt operation are called the adapt variables of A.

3. During its execution, A has exclusive access to the adapt variables of A, which may be effected with semaphores.

The first requirement makes sure that the effects of internal variations within P1 are invisible to the outer world. The second requirement makes sure that the effects of actions by the outer world (such as adapt) are invisible to the internal actions in P1. The third requirement avoids that a state transition in P1 would be 'committed' in the middle of executing an adapt. A consequence is that adapt operations should be kept as brief as possible.

The simplest way to satisfy the second requirement is not to let the adapt operation modify variables in the domain of P1, but to have it copy information from the domain of P1 to P2 only. This is overly restrictive as explained with reference to the discussion of FIGS. 5, 6. See especially the adapt operation rem_adapt, that writes to the variable key0, which variable is not read by the (external) sender process of rem_adapt. Whether the second requirement is indeed fulfilled, can usually be determined from the specification of the shared component in which the adapt operation occurs, as exemplified by rem_adapt. The first and third requirements relate purely to implementation and can in principle always be satisfied.

Figure 7:
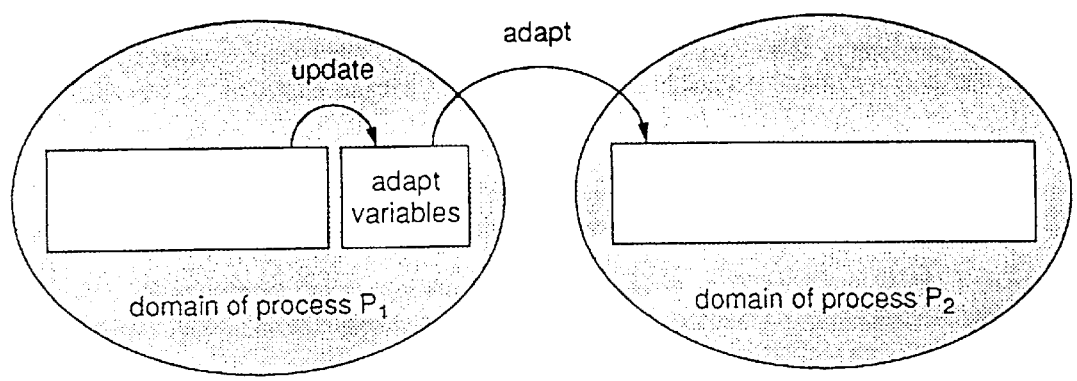
FIG. 7 gives a spatial image of adapt operations.

FIG. 7 gives a spatial image of adapt operations. Requirement #1 supra implies that when P1 executes a step S during execution of A, then the adapt variables in the domain of P1 should be consistent with the state of P1 immediately before the execution of S. After step S has been completed, the adapt variables must be 'updated', if necessary, to reflect the state immediately after the execution of S. In other words, the moment of executing the 'update', coincides with the commitment time of the state transition represented by the step, as shown in FIG. 7.

The above leads to a scheme wherein a process P1 is able to signal that after completing its step, an 'update' operation must be executed, and to signal to another process P2 that before the next step of P2 an 'adapt' operation must be executed. Like adapt operations executed by means of the primitive SYNC, update operations are executed by means of the primitive COMMIT, supplied by the run-time system. Thereby, all update operations signalled by a process during a step, are executed as a single atomic action.

Generally, it is not feasible before completion of a process step, and before the update operation has been performed, to signal from this step that an adapt operation should be performed by another process. Hence the proper way is to let the update operations perform the signalling of the required adapt operations. This implies that during the execution of its step, a process only signals update operations, while all adapt operations are signalled at the end of the step when the update operations are executed. In the specification of a component only the adapt operations occur; update operations are auxiliary operations that may be necessary for a proper implementation of the adapt operations.

Figure 8:
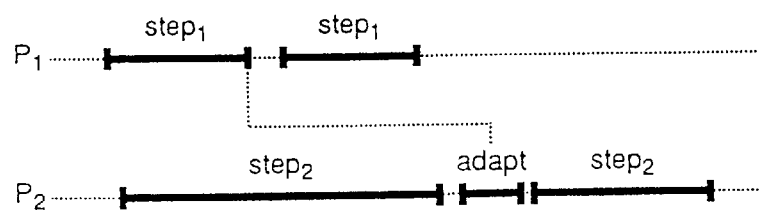
FIG. 8 illustrates disabling of adapt operations.

FIG. 8 illustrates disabling of adapt operations. At the specification level, an adapt operation is specified as a normal state transformer that may succeed or fail, dependent on the value of its precondition when it is executed. Herein, failure means the absence of any effect of the adapt. Since an adapt operation is signalled at the moment its precondition becomes true, in principle it is possible to implement only the success behaviour of the operation, in that the precondition is not tested. In FIG. 8, an unsafe situation occurs, in that the adapt operation is signalled at the end of step1, but in process P2 delayed until such time when the next step1 has already been executed completely, which may make the precondition false. Execution of the adapt should have no effect now, otherwise the implementation would be inconsistent with the specification which indicates that the adapt fails. Such unsafe situations are avoided by implementing the precondition of an adapt operation as an explicit test. If the precondition is false, the adapt operation should have no effect.

Figure 9:
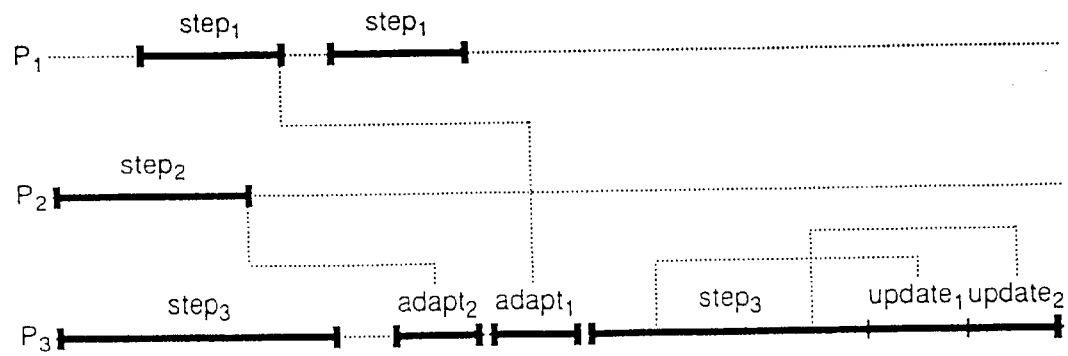
FIG. 9 shows the adapt/update scheme.

FIG. 9 shows a generalized adapt/update scheme. According to the invention, the general scheme to make processes communicate and synchronized can be characterized as follows:

1. A process P may signal that an update operation should be performed immediately after its step has been completed;

2. A process P may signal to another process Q, that before the next step of Q an adapt operation should be performed;

3. The executing of adapt and update operations is taken care of by the synchronization primitives.

An example is shown in FIG. 9, wherein two adapt operations adapt1 and adapt2 are signalled by the steps of two respective processes P1 and P2 to a receiver process P3 and are executed immediately before the next step3 of P3. Moreover, two update operations update1 and update2 are signalled during the execution of step 3 of process P3, and executed immediately after the end of step3. From a specification point of view, the executing of the update operations is part of the step3 in question, since the update operations 'commit' the state transition made by the step. This is the reason that the thick line representing their execution is immediately joined to the thick line representing the execution of the step itself.

A requirement to both update and adapt operations is that they should be extremely short. The reason is that they must have exclusive access to the adapt variables of the process, which may for example be achieved by using semaphores, or less favourably, by disabling interrupts. In either case, running processes may have to be suspended. So, update and adapt operations should not copy large blocks of data. Rather than copying data, they should execute data moves exclusively by changing associated pointers.

What is claimed is:

1. A method for synchronizing concurrent sequential processes said method comprising:

assigning intra-process update operations that are exclusive to a transmitting process of the concurrent sequential processes; and assigning inter-process adapt operations that are synchronous with a receiving process of the concurrent sequential processes;

wherein:

each intra-process update operation:
effects a transfer of information from the transmitting process to an in-channel part of an I/O channel, and
is independent of the receiving process; and each inter-process adapt operations:
effects a transfer of information from the in-channel part of the I/O channel to the receiving process, and
is non-interfering with the transmitting process such that information is transferred from the transmitting process to the receiving process via an intra-process update operation followed by an inter-process adapt operation only.

2. A method as claimed in claim 1, wherein each intra-process operation causes an update operation signalling, to render a subsequent adapt operation pending at the receiving process.

3. A method as claimed in claim 1, wherein a process terminates its action sequence atomicity by executing any of three synchronizing operators: commit, sync, or wait.

4. A method as claimed in claim 2, wherein a process terminates its action sequence atomicity by executing any of three synchronizing operators: commit, sync, or wait.

5. A method as claimed in claim 3, wherein the operator commit executes all pending update operations in a single atomic action, wherein the operator sync executes all pending adapt operations as individual atomic actions, and wherein the operator wait blocks the current process until there is at least one pending adapt.

6. A method as claimed in claim 5, and having a compound operator next that executes all pending update operations in a single atomic action, followed by executing all pending adapt operations of a current process.

7. A method as claimed in claim 6, and having a compound operator await(x) that executes the above operator next, and subsequently reevaluates x, while letting the process in question continue exclusively subject to return of a boolean 'true'.

8. A system having a plurality of concurrent sequential processes that are synchronized on the basis of assigned intra-process update operations and inter-process adapt operations,
wherein:
the intra-process update operations are exclusive to a transmitting process of the concurrent sequential processes:
the inter-process adapt operations are synchronous with a receiving process of the concurrent sequential processes;
each intra-process update operation:
effects a transfer of information from the transmitting process to an in-channel part of an I/O channel, and is independent of the receiving process; and
each inter-process adapt operations:
effects a transfer of information from the in-channel part of the I/O channel to the receiving process, and is non-interfering with the transmitting process
such that information is transferred from the transmitting process to the receiving process via an intra-process update operation followed by an inter-process adapt operation only.

9. A system as claimed in claim 8, wherein each intra-process update operation is arranged to cause an update operation signalling, to render a subsequent adapt operation pending at the receiving process.

10. A system as claimed in claim 8, wherein a process is arranged for terminating its action sequence atomicity by executing any of three synchronizing operators: commit, sync, or wait.

11. A system as claimed in claim 8, wherein a process is arranged for terminating its action sequence atomicity by executing any of three synchronizing operators: commit, sync, or wait.

12. A method for synchronizing concurrent sequential processes comprising:
maintaining a first copy and a second copy of information items associated with the processes at a communications channel, wherein the first copy is accessible only by a sender of the information items, and the second copy is accessible only by a receiver of the information items;
updating the first copy of the information items via an intra-process update command that is issued by the sender of the information items, and
updating the second copy of the information items, based on the first copy of the information items, via an inter-process adapt command that is synchronous with the receiver of the information items,
thereby effecting a transfer of the information items that is atomic and non-interfering with the sender while also being atomic and synchronous with the receiver.

13. A method as claimed in claim 12, further including
communicating an update signalling to the receiver of the information items whenever the first copy of the information items is updated.

14. A method as claimed in claim 12, further including
maintaining a list of information items that are pending for updating, and
wherein
updating the first copy of the information items effects updating each information item in the list of information items that are pending for updating as an atomic operation.

15. A method as claimed in claim 12, further including:
updating a first copy of other information items, based on a second copy of the other information items, via an inter-process adapt command that is synchronous with the transmitter.

16. A method as claimed in claim 13, further including
blocking other processes in the receiver until the update signalling is communicated to the receiver.

17. The system of claim 15, further including
a list of pending information items that are pending for updating, and
wherein
the information items are transferred to the first memory in accordance with the list of pending information items as an atomic operation upon execution of the intra-process process update command.

18. A system comprising:
at least one sender process,
at least one receiver process that shares information items with the sender process, and
at least one channel,
wherein
the channel comprises:
a first memory for containing a first copy of the information items, and
a second memory for containing a second copy of the information items, and
the information items are transferred to the first memory via an intra-process update command that is issued by the sender process, and
the information items are transferred from the first memory to the second memory via an inter-process adapt command that is synchronous with the receiver process and non-interfering with the sender process,
so that the information items are transferred from the sender process to the receiver process via a sequence of an intra-process update command and inter-process adapt command only.

19. The system of claim 18, wherein
the inter-process adapt command is executed in response to an update signaling when the information items are transferred to the first memory.

20. The system of claim 19, wherein
other processes at the receiver process are blocked in dependence upon the update signalling.

* * * * *